March 22, 1927. 1,621,504
C. A. GOODSPEED
WHEEL BLOCK
Filed June 8, 1925 2 Sheets-Sheet 2
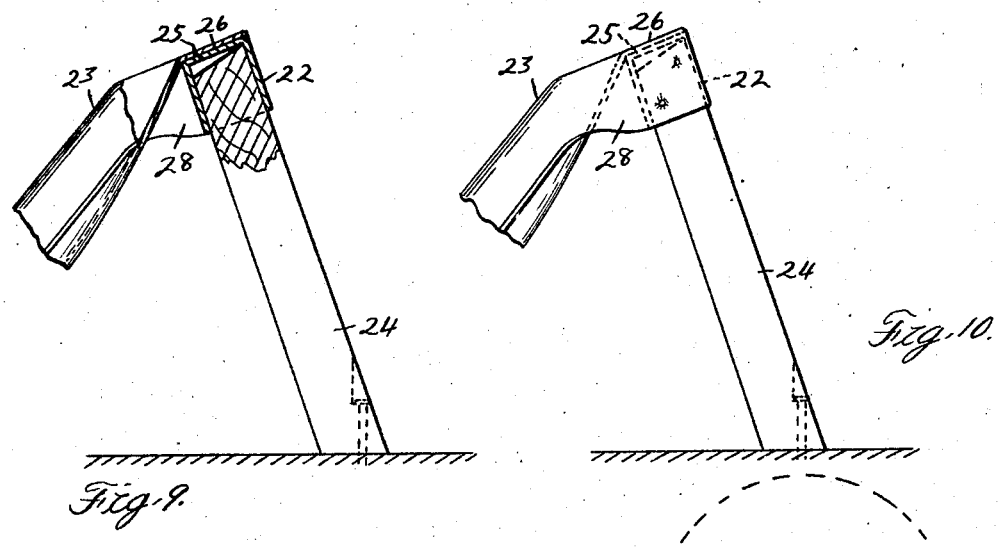
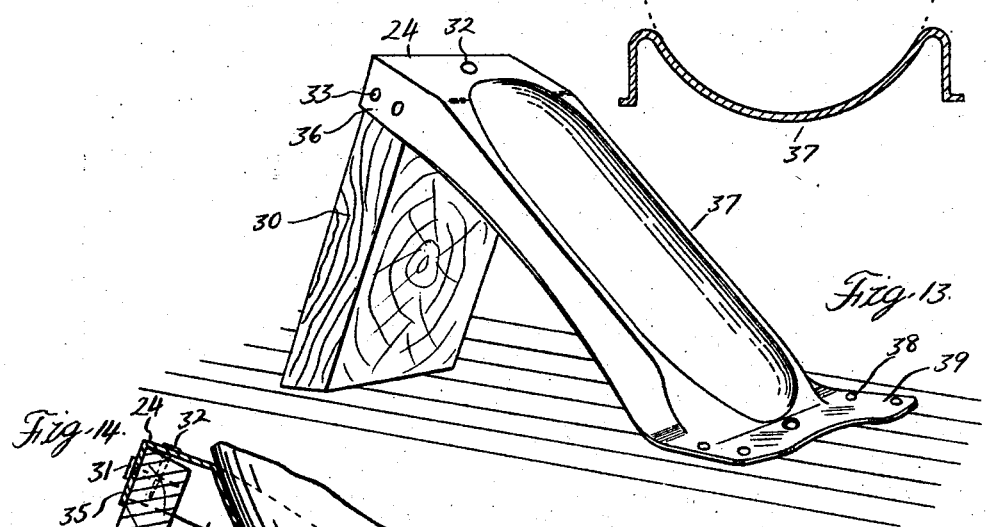
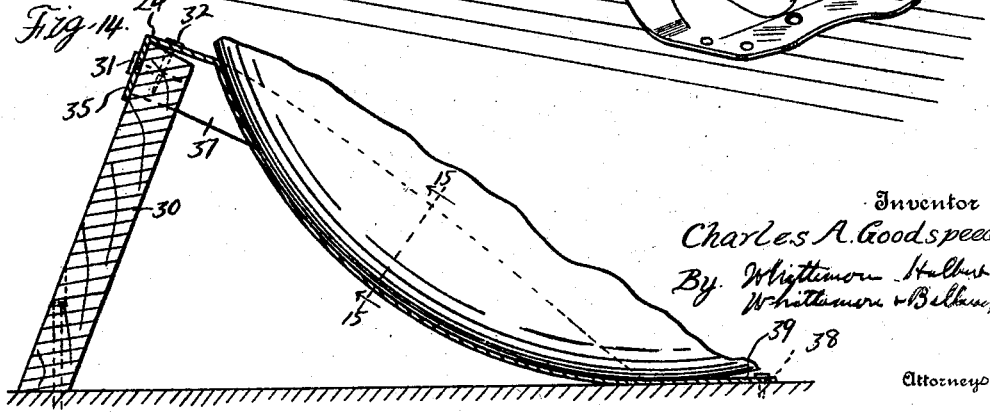
Inventor
Charles A. Goodspeed
By Whittemore Hulbert
Whittemore & Belknap
Attorneys Patented Mar. 22, 1927.

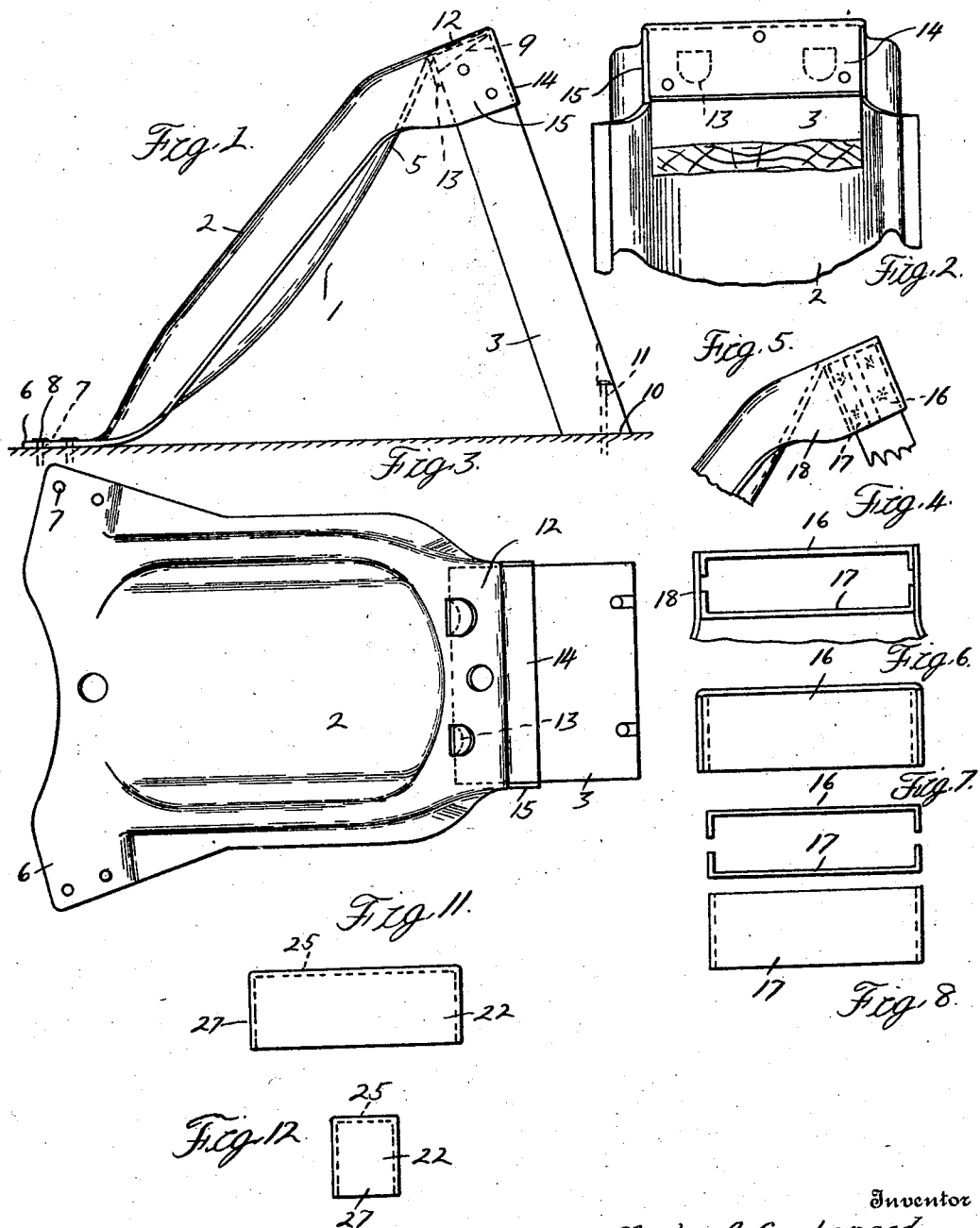

1,621,504

UNITED STATES PATENT OFFICE.

CHARLES A. GOODSPEED, OF DETROIT, MICHIGAN, ASSIGNOR TO WM. W. BLAKELY, OF DETROIT, MICHIGAN.

WHEEL BLOCK.

Application filed June 8, 1925. Serial No. 35,751.

This invention relates generally to wheel blocks, particularly those designed for holding vehicles against movement within carriers while in transit, and consists of certain novel features of construction, combinations and arrangements of parts as will be more fully described and particularly pointed out in the appended claims.

In the accompanying drawings:

Figure 1 is a side elevation of a wheel block embodying my invention.

Figure 2 is an end elevation of the wheel engaging member.

Figure 3 is a fragmentary top plan view of the wheel engaging member.

Figure 4 is a fragmentary bottom plan view of a slightly modified form of wheel block.

Figure 5 is a fragmentary side elevation of the wheel engaging member shown in Figure 4.

Figure 6 is a rear end elevation of the wheel engaging member shown in Figures 4 and 5.

Figure 7 is a detail plan view of the two brackets which form the socket.

Figure 8 is a rear elevation of one of the U-shaped brackets.

Figure 9 is a fragmentary side elevation of another modification, partly in section.

Figure 10 is a fragmentary side elevation of the construction shown in Figure 9.

Figure 11 is a rear elevation of the socket member shown in Figures 9 and 10.

Figure 12 is an end elevation of the socket member shown in Figure 11.

Figure 13 is a perspective view of another modified form of wheel block.

Figure 14 is a vertical sectional view of the wheel block shown in Figure 13 in engagement with a vehicle wheel.

Figure 15 is a cross sectional view taken on the line 15—15 of Figure 14.

In the present state of the art it is usual to secure various forms of wheel blocks to the floors of carriers such as freight cars and the like for holding vehicles against movement while in transit. Inasmuch as such blocks are used regularly by vehicle manufacturers during the shipment of vehicles from the factories, it is desirable to return the used blocks to the shippers after the vehicles in transit reach their destinations so that the returned blocks may be used again for further shipments. However, the blocks now in use are constructed entirely of wood or entirely of metal, hence such blocks cannot be conveniently returned as desired. Moreover the cost of returning such bulky blocks is prohibitive. As a result a new supply of blocks has to be used for each shipment and the cost of shipping the vehicles is necessarily increased accordingly.

To overcome these objectionable features, I have provided a wheel block that is preferably formed of wood and metal and comprises two sections which may be easily and quickly assembled or taken apart. With my construction the wheel engaging section is preferably formed of light gauge sheet metal and is fashioned in such a way that a plurality thereof are capable of nesting in a very small space hence these sections may be compactly arranged and conveniently returned to the shipper at a comparatively low cost. Furthermore the inclined braces for the wheel engaging sections are preferably constructed of relatively wide flat bars of wood, hence these bars may also be compactly arranged and conveniently returned to the shipper if desired. Moreover the opposite ends of these wood braces are preferably constructed alike so that either end may be engaged with the wheel engaging section or the floor of the carrier. Thus, a material saving in time may be effected when assembling the sections of the blocks preliminary to fastening the same to the floor of the carrier.

Referring now to the drawings, the numeral 1 designates a wheel block embodying my invention comprising a rearwardly inclined wheel engaging section 2 and a forwardly inclined brace section 3. As shown, the wheel engaging section 2 preferably comprises an inverted channel-shaped member which is preferably formed of light gauge sheet metal, while the brace 3 preferably comprises a flat bar which is preferably constructed entirely of wood. In order that these sections 2 and 3 respectively will have a firm engagement with the floor of a carrier such as a freight car and the like, the base 5 of the channel member 2 is preferably provided with a forwardly projecting flange 6 which is provided at its side edges with suitable apertures 7 for receiving securing elements such as nails 8, while the wood brace 3 is preferably bevelled at its opposite ends as shown at 9 and 10 respectively. Thus, either end of the brace 3 may be engaged with the floor. Any suitable means such as the nails 11 may be employed for securing the brace 3 to the floor of the carrier.

An important feature of the present invention is the connection between the wheel engaging member 2 and the brace 3 therefor. Inasmuch as it is desirable to return the wheel blocks or the wheel engaging sections 2 thereof, I have provided various forms of wheel blocks having sections that may be easily and quickly assembled or taken apart. For instance in Figures 1 to 3 inclusive of the drawings, the base 5 of the channel member is preferably provided at its rear end with a flat rearwardly inclined bearing portion 12 that is adapted to be engaged by the upper end of the brace 3 and is also preferably provided adjacent to its rear end with spaced struck-out lugs 13 that are preferably bent downwardly from the flat bearing portion 12 in substantial parallel relation to a depending flange 14 at the rear end of the channel member 2. Thus, these tongues 13 cooperate with the depending flange 14 and the side flanges 15 of the channel member 2 to form a suitable pocket or socket for receiving the upper end of the brace 3. In Figures 4 to 8 inclusive, the depending flange at the rear end of the channel member is dispensed with and the pocket for the upper end of the brace is preferably formed by securing two channel-shaped bars 16 and 17 respectively in opposed spaced relation between the side flanges 18 of the channel-shaped wheel engaging member 19. As shown, the side flanges 20 and 21 respectively of the channel members 16 and 17 are preferably welded to the side flanges 18 of the channel members at the rear end of the latter. In Figures 9 to 12 inclusive a trough shaped metal member 22 is secured to the channel member 23 and constitutes the pocket or socket member for receiving the upper end of the brace 24. As shown, the base 25 of the trough-shaped member 22 is preferably welded to the base 26 of the channel member 23, while the end walls 27 of the trough-shaped member 22 are preferably welded to the side flanges 28 of the channel member 23.

Hence, the constructions thus far described may be readily assembled by merely inserting one end of the brace into the pocket carried by the wheel engaging member and may be readily taken apart by merely withdrawing the brace from the pockets. Thus, separate or additional fasteners are not required. In use, the assembled parts may be secured to the floor of the carrier by any suitable means such as nails and the like.

In Figures 13 to 15 inclusive I have shown still another modification in which the wood brace 30 is rigidly secured, preferably by nails 31, 32, and 33 respectively to the flat bearing portion 34 and depending flanges 35 and 36 respectively of the channel-shaped wheel engaging member 37.

In use, the assembled blocks may be quickly secured to the floor of a carrier by merely driving suitable nails through the openings 38 in the forwardly projecting flange 39 of the channel member 37 and through the wood brace 30.

Thus, from the foregoing description, it will be readily apparent that the nails engaging the flange 39 are applied only at the outer side of the vehicle wheel. This saves time in securing the block to the floor of the carrier. Moreover this arrangement prevents the skewing of the wheel engaging member. Inasmuch as the wheel engaging section of my block is formed of light gauge metal the weight of the block is considerably less than any all steel block. This is a very important feature of the success of substituting a returnable block for the ordinary grooved wood blocks now in general use, especially because the cost of returning my blocks is very materially lowered. In fact the return cost is the principal reason that the automobile manufacturers have up to this time consistently refused to adopt a steel shipping block in place of the conventional wood block. Furthermore the connection between the sections of my block is such that the parts may be quickly taken apart and conveniently returned to the shipper. Thus, a material saving in time and money is effected.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A wheel block comprising an inclined sheet metal member having a flat bearing portion and marginal flange portions, an oppositely inclined brace for the upper end of the said member, means securing the flange portions of said member to the sides of said brace, and means rigidly securing the flat bearing portion of said member to the upper end of said brace.

2. A wheel block formed of detachable parts comprising a metal wheel engaging member, and a wood brace, said wheel engaging member having an inclined body portion and a socket at the upper end of said body portion, and said brace having beveled ends alternately engageable with the base of said socket.

3. A wheel block for holding vehicles against movement within carriers while in transit comprising a sheet metal wheel engaging member having a flange at its lower end attachable to a floor of a carrier, a downwardly opening socket at the upper end of said wheel engaging member, and a removable brace having a portion attachable to the floor of a carrier and having another portion fitting within said socket.

4. A wheel block for holding vehicles against movement within carriers while in transit formed of detachable parts including a wheel engaging member, a portion at its lower end attachable to a floor of a carrier and having a downwardly opening substantially U-shaped socket at its upper end, and a brace for said wheel engaging member, the end portions of said brace being bevelled to alternately lie flat upon the floor of a carrier and being constructed so as to be alternately insertable within the socket of said wheel engaging member.

5. A wheel block for holding vehicles against movement within carriers while in transit comprising an upwardly inclined wheel engaging member having a downwardly opening socket at its upper end and a brace for said wheel engaging member having a portion attachable to a floor of a carrier and having another portion fitting within said socket, said brace and wheel engaging member being separable and formed of different materials.

6. A wheel block for holding vehicles against movement within carriers while in transit comprising a metal wheel engaging member having a portion at one end attachable to a floor of a carrier and having depending projections at the other end thereof, and a brace for said wheel engaging member having one end attachable to a floor of a carrier and having the other end thereof detachably engaging said projections.

7. A wheel block comprising only two parts, one of said parts being a wheel engaging member having a portion at its lower end attachable to a floor of a carrier and having a downwardly opening socket at its upper end, and the other part being a brace having one end thereof detachably engaging said socket.

8. A wheel block comprising a brace having bevelled ends alternately engageable with and attachable to a floor of a carrier, and a wheel engaging member having one part attachable to a floor of a carrier and having another part thereof detachably engaging one of the bevelled ends of said brace.

9. A wheel block comprising a wheel engaging member having depending marginal flanges at the sides and at one end thereof, and a projection depending from said member adjacent to the depending flange at one end thereof and cooperating with said flange and the depending marginal side flanges to form a downwardly opening socket, and a brace for said wheel engaging member having one end attachable to a floor of a carrier and having the other end thereof detachably engaging the socket formed by said flanges and projection.

In testimony whereof I affix my signature.

CHARLES A. GOODSPEED.